(12) United States Patent
Arendt et al.

(10) Patent No.: US 7,939,008 B2
(45) Date of Patent: May 10, 2011

(54) BLOW-MOLDED WHEELS HAVING UNDERCUT TREADS, METHODS FOR PRODUCING THE SAME, AND CHILDREN'S RIDE-ON VEHICLES INCLUDING THE SAME

(75) Inventors: Albert L. Arendt, West Seneca, NY (US); James R. Carducci, East Aurora, NY (US); Christopher F. Lucas, Cheektowaga, NY (US)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 12/577,565

(22) Filed: Oct. 12, 2009

(65) Prior Publication Data

US 2010/0025948 A1   Feb. 4, 2010

Related U.S. Application Data

(62) Division of application No. 11/509,421, filed on Aug. 23, 2006, now Pat. No. 7,621,543.

(51) Int. Cl.
*B29C 49/30* (2006.01)
*B29C 49/00* (2006.01)

(52) U.S. Cl. ......... 264/501; 264/512; 264/523; 264/524

(58) Field of Classification Search ........................ None
See application file for complete search history.

(56) References Cited

U.S. PATENT DOCUMENTS

| | | | |
|---|---|---|---|
| 2,601,700 A | 7/1952 | Pinsky et al. | |
| 3,029,468 A | 4/1962 | Valyi | |
| 3,135,997 A | 6/1964 | Smyser | |
| 3,264,780 A * | 8/1966 | Doe | 446/465 |
| 3,373,460 A | 3/1968 | Ladney, Jr. | |
| 3,570,057 A | 3/1971 | Doyle | |
| 3,592,885 A | 7/1971 | Goins et al. | |
| 3,616,491 A | 11/1971 | Vollers | |

(Continued)

FOREIGN PATENT DOCUMENTS

DE        10125824 A1      12/2002

(Continued)

OTHER PUBLICATIONS

English-language abstract of German Patent No. DE 10125824A1, 2002.

(Continued)

*Primary Examiner* — Monica A Huson
(74) *Attorney, Agent, or Firm* — Dascenzo Intellectual Property Law, P.C.

(57) ABSTRACT

Improved blow-molded wheels, methods for producing the same, and children's ride-on vehicles including the same are disclosed. The blow-molded wheels may include a blow-molded body that has a tread surface, first and second sidewalls and an axis. The body may be configured to rotate about the axis. The tread surface may extend circumferentially around the body and may extend between the first and second sidewalls. A first region of the tread surface may be disposed between the first sidewall and a part line of the blow-molded body. A second region of the tread surface may be disposed between the first region and the part line. A first radial distance from the axis to the first region may exceed a second radial distance from the axis to the second region by at least a first predetermined threshold.

17 Claims, 6 Drawing Sheets

U.S. PATENT DOCUMENTS

| | | | |
|---|---|---|---|
| 3,692,453 A | 9/1972 | Quigg | |
| 3,730,658 A | 5/1973 | Marra | |
| 3,779,688 A | 12/1973 | Jullien-Davin | |
| 3,817,676 A | 6/1974 | Seefluth | |
| 3,851,029 A | 11/1974 | Cornett, III et al. | |
| 3,888,545 A | 6/1975 | Braun | |
| 3,907,370 A | 9/1975 | Bard | |
| 3,936,264 A | 2/1976 | Cornett, III et al. | |
| 4,063,868 A | 12/1977 | Piotrowski | |
| 4,323,411 A | 4/1982 | Uhlig | |
| 4,513,981 A * | 4/1985 | DeGraaff et al. | 280/828 |
| 4,516,648 A | 5/1985 | Berger et al. | |
| 4,531,704 A | 7/1985 | Matthei | |
| 4,588,542 A | 5/1986 | Pierce | |
| 4,717,113 A | 1/1988 | Martin | |
| 4,832,307 A | 5/1989 | Watanabe et al. | |
| 4,854,849 A | 8/1989 | Sudo | |
| 4,884,961 A | 12/1989 | Iizuka et al. | |
| 4,889,480 A | 12/1989 | Nakamura et al. | |
| 5,104,198 A | 4/1992 | Prout et al. | |
| D327,048 S | 6/1992 | Markling et al. | |
| 5,219,594 A | 6/1993 | Meyer et al. | |
| 5,227,114 A | 7/1993 | Moore | |
| 5,316,135 A | 5/1994 | Kneer et al. | |
| 5,316,377 A | 5/1994 | Markling et al. | |
| 5,368,371 A | 11/1994 | Markling | |
| 5,518,682 A | 5/1996 | Markling et al. | |
| 5,556,601 A | 9/1996 | Huvey et al. | |
| 5,573,129 A | 11/1996 | Nagata et al. | |
| 5,736,168 A | 4/1998 | Goyal et al. | |
| 5,750,067 A | 5/1998 | Hellbrugge | |
| 5,799,809 A | 9/1998 | Sako et al. | |
| 5,810,452 A | 9/1998 | Hawthorne et al. | |
| 5,879,484 A * | 3/1999 | Spragg et al. | 152/516 |
| 5,908,124 A | 6/1999 | Klauke et al. | |
| 5,924,506 A | 7/1999 | Perego | |
| 6,068,161 A | 5/2000 | Soehnlen et al. | |
| 6,095,543 A | 8/2000 | McMahon et al. | |
| 6,170,920 B1 | 1/2001 | Markling | |
| 6,318,983 B1 | 11/2001 | Lopez et al. | |
| 6,431,406 B1 | 8/2002 | Pruett | |
| 6,446,981 B1 | 9/2002 | Wise et al. | |
| 6,464,305 B2 | 10/2002 | Markling | |
| 6,470,982 B2 | 10/2002 | Sitarski et al. | |
| 6,520,597 B1 | 2/2003 | Markling | |
| 6,591,986 B2 | 7/2003 | Soehnlen et al. | |
| 6,872,354 B1 | 3/2005 | Mol et al. | |
| 6,896,335 B2 | 5/2005 | Markling | |
| 6,913,324 B2 | 7/2005 | Markling | |
| 6,953,333 B1 | 10/2005 | Feuerherm et al. | |
| 7,621,543 B2 * | 11/2009 | Arendt et al. | 280/29 |
| 2003/0085611 A1 | 5/2003 | Markling | |
| 2004/0070262 A1 | 4/2004 | Markling | |
| 2005/0056474 A1 | 3/2005 | Damon | |
| 2008/0006456 A1 * | 1/2008 | Lucas et al. | 180/65.1 |

FOREIGN PATENT DOCUMENTS

| | | |
|---|---|---|
| JP | 1-034721 | 2/1989 |
| JP | 4-65219 | 3/1992 |
| JP | 5-124095 | 5/1993 |
| JP | 2002-192607 | 7/2002 |
| WO | WO 2008/008173 A2 | 1/2008 |
| WO | WO 2008/008173 A3 | 1/2008 |

OTHER PUBLICATIONS

English-language abstract of Japanese Patent Publication No. JP 2002-192607, 2002.
English-language abstract of Japanese Patent No. JP 5-124095, 1993.
English-language abstract of Japanese Patent No. JP 4-65219, 1992.
English-language abstract of Japanese Patent No. JP 1-034721, 1989.
International Search Report for International Application No. PCT/US07/17676.
Written Opinion of the International Searching Authority for International Application No. PCT/US07/17676.

* cited by examiner

BLOW-MOLDED WHEELS HAVING UNDERCUT TREADS, METHODS FOR PRODUCING THE SAME, AND CHILDREN'S RIDE-ON VEHICLES INCLUDING THE SAME

RELATED APPLICATION

The present application is a divisional application of, and claims priority under 35 U.S.C. §121 to, U.S. patent application Ser. No. 11/509,421, which was filed on Aug. 23, 2006, now U.S. Pat. No. 7,621,543, and the complete disclosure of which is hereby incorporated by reference.

FIELD OF THE DISCLOSURE

The present disclosure relates to children's ride-on vehicles, and more particularly to blow-molded wheels for children's ride-on vehicles and methods for producing the same.

BACKGROUND OF THE DISCLOSURE

Children's ride-on vehicles are reduced-scale vehicles that are designed and sized for use by children. For example, children's ride-on vehicles include a seat adapted to accommodate one or more children as well as steering and drive assemblies that are adapted to be operated by a child sitting on the seat. The drive assembly is adapted to drive the rotation of one or more of the vehicle's wheels and may include a battery-powered motor assembly or a manually powered drive assembly, such as a pedal-powered drive assembly.

The wheels used on children's ride-on vehicles are often blow-molded from a suitable material, such as a plastic. Blow-molded wheels are conventionally formed using a mold that has two portions, which typically separate in an axial direction. The portions of the mold collectively define a cavity that defines, or corresponds to, the shape of the blow-molded wheels, including the tread surface. The seam, or part line, between the axially-separating mold portions typically defines, or corresponds to, the central circumferential portion of the wheel. During the blow-molding process, a parison of molten plastic is introduced into the mold cavity and a pressurized gas, such as air, is used to force the molten plastic against the internal surface of the cavity in order to form a hollow wheel having a shape defined by the internal surface of the cavity. After a cooling period, the mold portions are separated, and the blow-molded wheel is removed.

Blow-molded articles, including blow-molded wheels, as well as the corresponding molds and processes used to produce such articles, should be configured to permit removal of the finished article from the mold without deforming, tearing, or otherwise damaging the finished article. Projections or hollows on the surface of a blow-molded article typically correspond to hollows or projections on the inner surface of the corresponding mold. Removal of a completed blow-molded article from its mold withdraws the mold projections from hollows on the blow-molded article. Similarly, the projections on the surface of the blow-molded article are removed from the hollows on the inner surface of the mold during mold removal. When such projections or hollows are oriented generally parallel to the direction of mold removal, the projections on the mold or article are simply pulled out of the corresponding hollow during mold removal. In contrast, when the projections or hollows on a blow-molded article are not oriented generally parallel to the direction of mold removal, such as when they are oriented generally perpendicular to the direction of mold removal, such projections or hollows may be said to overlap corresponding portions of the mold with respect to the direction of mold-removal. Blow-molded articles that have projections or hollows that overlap corresponding portions of the mold with respect to the direction of mold-removal are commonly referred to as being "undercut."

Small undercuts may be permissible because blow-molded articles tend to shrink slightly during cooling, such that the article may pull away from the mold and release the overlap. Further, blow-molded articles may permit a small amount of elastic deformation or deflection, which may be sufficient to release small undercuts. However, undercuts over a certain threshold may effectively lock a blow-molded article into its mold. In particular, if an undercut is too large, the shrinkage and/or potential elastic deformation of the blow-molded article may be insufficient to permit removal of the finished article without damage. Conventionally, blow-molded wheels must have undercuts of ⅛ inch (3.175 millimeters) or less so that they may be removed from the molds used to form the wheels.

As discussed above, blow-molded wheels are typically blown in a mold that opens in an axial direction. By using a mold that opens in an axial direction, blow-molded wheels may have significant axially oriented projections or hollows, such as may be used to form or detail the hub region of the wheel. However, in order to avoid significant undercuts that might lock a blow-molded wheel into its mold, the design of the tread surface on a blow-molded wheels is typically of limited complexity. In the case of blow-molded wheels used with children's ride-on vehicles, which are often intended to resemble full-sized vehicles, the limited complexity of the tread designs typically provided on blow-molded wheels limits the realism of the blow-molded wheels, which are often intended to resemble rubber tires.

SUMMARY OF THE DISCLOSURE

The present disclosure is directed to blow molded wheels having undercut treads, methods for producing the same, and children's ride-on vehicles including the same.

The blow-molded wheels may include a blow-molded body that has a tread surface, first and second sidewalls and an axis. The body may be configured to rotate about the axis. The tread surface may extend circumferentially around the body and may extend between the first and second sidewalls. A first region of the tread surface may be disposed between the first sidewall and a part line of the blow-molded body. A second region of the tread surface may be disposed between the first region and the part line. A first radial distance from the axis to the first region may exceed a second radial distance from the axis to the second region by at least a first predetermined threshold.

The methods for producing the blow-molded wheels may include providing a mold that has first and second mold portions. The first and second mold portions may collectively define a mold cavity that is configured to mold a wheel having a tread surface, first and second sidewalls and an axis. The first and second mold portions may be configured to separate in a direction parallel to the axis of the wheel.

At least one of the first and second mold portions may include a first tread-molding portion and at least one second tread-molding portion. The first tread-molding portion may be configured to mold a first region of the tread surface, which may be disposed between the first sidewall and a part line defined by an interface between the first and second mold portions. The second tread-molding portion may be configured to mold a second region of the tread surface, which may be disposed between the first region and the part line.

The second tread-molding portion may be configured to move inwardly and outwardly relative to the first tread-molding portion, such as between a molding position and a release position. This relative movement of the second tread-molding portion may additionally or alternatively be referred to as movement toward and away from the mold cavity and/or movement into and out of the mold cavity. In the molding position, the second tread-molding portion may be positioned relative to the first tread-molding portion such that a first radial distance from the axis to at least a first region of the first tread-molding portion may exceed a second radial distance from the axis to at least a second region of the second tread-molding portion by a first predetermined threshold. In the release position, the second tread-molding portion may be positioned relative to the first tread-molding portion such that a third radial distance from the axis to a third region of the second tread-molding portion may be at least as great as a distance corresponding to a fourth radial distance from the axis to a fourth region of the first tread-molding portion that is adjacent the third region of the second tread-molding portion when the second tread-molding portion is in the release position less a second predetermined threshold.

The methods for producing the blow-molded wheels may further include forming a parison of molten material, positioning the parison between the first and second mold portions, and closing the first and second mold portions on the parison. A pressurized gas may be injected into the parison to blow the parison into a blow-molded wheel having a shape corresponding to the shape of the mold cavity, including regions of the wheel corresponding to the first and second regions of the tread surface. Each of the at least one second tread-molding portion may be moved from the molding position to the release position, and the first and second mold portions may be separated to release the blow-molded wheel from the mold.

The blow-molded wheels may be used in a children's ride-on vehicle. The children's ride-on vehicle may include a body having at least one seat sized for a child and a plurality of wheels rotatably coupled to the body. The plurality of wheels may include at least one driven wheel and at least one steerable wheel. The children's ride-on vehicle may further include a steering assembly and a drive assembly. The steering assembly may include a steering mechanism adapted to receive steering inputs from a child sitting on the at least one seat and a steering linkage adapted to convey the steering inputs to the at least one steerable wheel. The drive assembly may be adapted to selectively drive the rotation of the at least one driven wheel.

DETAILED DESCRIPTION AND BEST MODE OF THE DISCLOSURE

Figure 1:
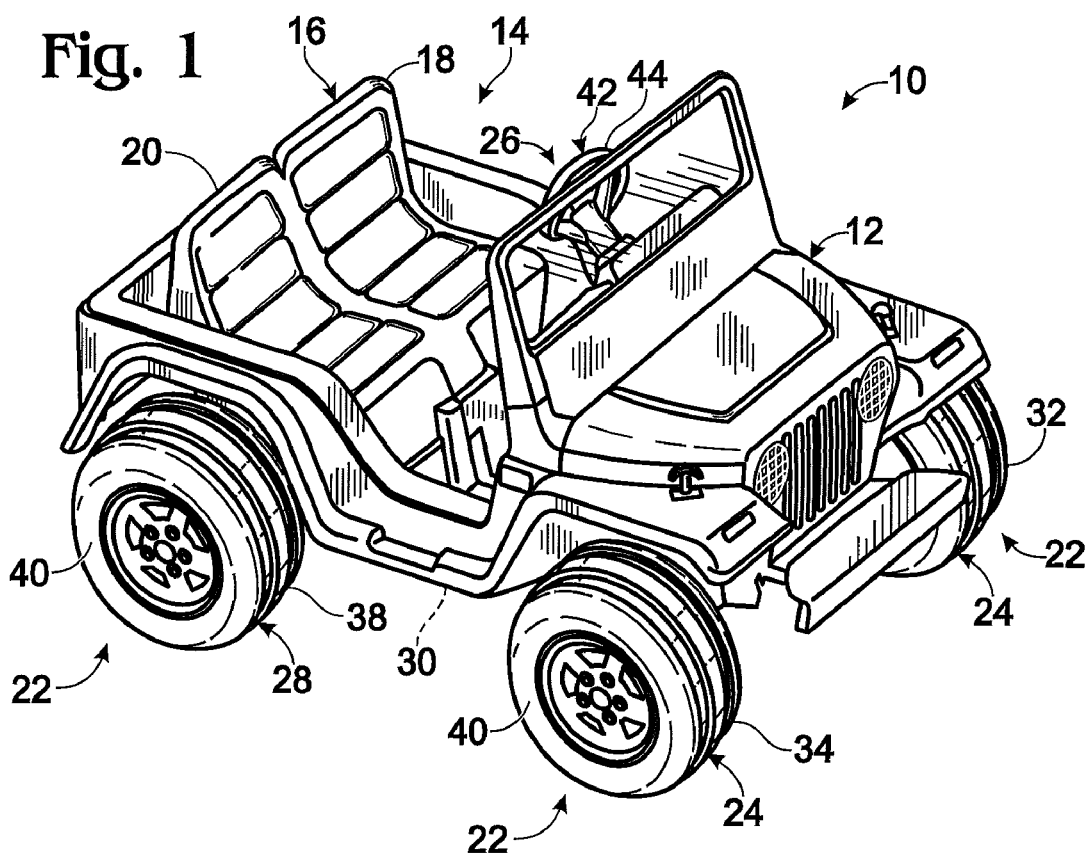
FIG. 1 is a perspective view of a children's ride-on vehicle having at least one blow-molded wheel according to the present disclosure.

An illustrative, non-exclusive example of a children's ride-on vehicle is shown in FIG. 1 and indicated generally at 10. Ride-on vehicle 10 includes a support frame, or body, 12 that provides a riding space, or passenger compartment, 14 with a seat assembly 16 that is sized and configured to accommodate at least one child, including a child driver. Seat assembly 16 may be integral with or otherwise mounted on body 12 and may have any suitable configuration, including configurations in which the position of the seat assembly is adjustable within the passenger compartment, and configurations in which the seat assembly includes two or more seats or two or more seating regions. Typically, vehicle 10 will be sized for use by a child driver or by a child driver and a child passenger. For example, in the illustrated embodiment, seat assembly 16 includes a pair of seats, or seating regions, 18 and 20, with seat 18 sized and positioned to receive a child driver and seat 20 sized and positioned to receive a child passenger.

Body 12 typically is formed from molded plastic and may be integrally formed or formed from a plurality of parts that are secured together by screws, bolts, clips or other suitable fasteners. Body 12 may additionally, or alternatively, be at least partially formed from other suitable material(s), such as metal, wood, or composite materials. Body 12 may include, or be mounted upon, an underlying frame, or chassis, or chassis portion, on which the rest of the body (which may be referred to as a body portion) is supported. The chassis portion may be formed from the same or different materials as the rest of the body; when present, the chassis portion is often formed of metal and/or molded plastic, with the body portion typically being formed of molded plastic. However, these illustrative examples of suitable materials of construction are not required.

As shown, body 12 is shaped to generally resemble a reduced-scale Jeep® vehicle. JEEP is a registered trademark of the Daimler Chrysler Corporation, and the JEEP mark and designs are used by permission. Children's ride-on vehicles according to the present disclosure may be shaped to generally resemble any type of vehicle. Examples of suitable vehicles are reduced-scale, or child-sized, vehicles that are shaped to resemble corresponding full-sized, or adult-sized, vehicles, such as cars, trucks, construction vehicles, emergency vehicles, off-road vehicles, motorcycles, space vehicles, aircraft, watercraft and the like. However, it is also within the scope of the present disclosure that vehicle 10 may be shaped to resemble fantasy vehicles that do not have a corresponding adult-sized counterpart. Although vehicle 10 is depicted in the form of a reduced-scale Jeep® vehicle, it will be appreciated that the components and/or features of vehicle 10 may be configured for use on any type of children's ride-on vehicle.

Figure 2:
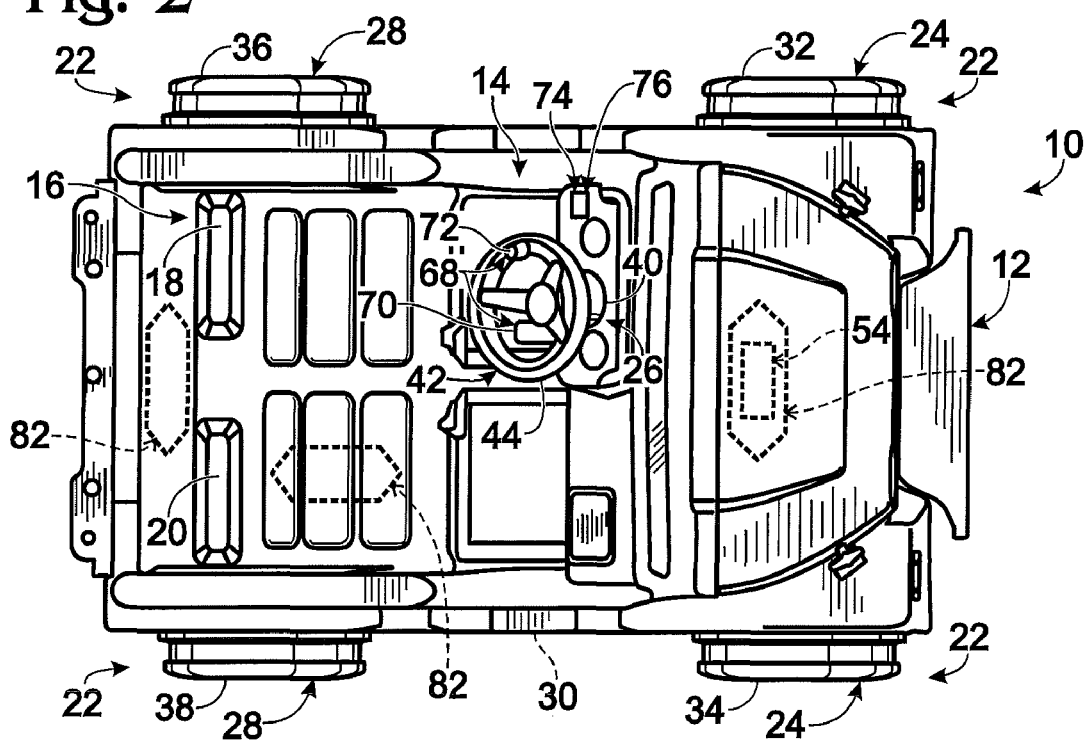
FIG. 2 is a top plan view of the children's ride-on vehicle of FIG. 1 with another example of blow-molded wheels according to the present disclosure.

Vehicle 10 also includes a plurality of wheels 22 that are rotatably coupled to body 12, as indicated in FIGS. 1-2. As discussed in more detail herein, the plurality of wheels includes at least one blow-molded wheel, such as at least one wheel having an undercut tread, such as one or more of the illustrative wheels shown and/or discussed with respect to FIGS. 5-7. The plurality of wheels includes a steerable wheel assembly 24 that contains at least one steerable wheel that is adapted to be steered by the vehicle's steering assembly 26, typically at least partially in response to user-imparted steering inputs thereto. The plurality of wheels further includes a driven wheel assembly 28 that contains at least one driven wheel that is adapted to be rotationally driven by the vehicle's drive assembly 30. As used herein, the term "driven wheel" refers to a wheel that is rotated in response to a rotational input from the vehicle's drive assembly, which is either directly conveyed to the wheel by the output of a motor assembly or pedal assembly, or which is conveyed through a linkage, such as a gearbox, belt, chain, gear assembly, axle, or the like.

In the illustrated embodiment, vehicle 10 includes four wheels 22, with front wheels 32 and 34 forming steerable wheel assembly 24, and rear wheels 36 and 38 forming driven wheel assembly 28. The number of wheels on the vehicle may vary from two wheels to three, four, six, or more wheels. However, children's ride-on vehicles typically include at least three wheels for stability. Similarly, each wheel assembly must contain at least one wheel, and a particular wheel may form all or a portion of both the steerable wheel assembly and the driven wheel assembly. For example, it is within the scope of the disclosure that either or both of front wheels 32 and 34 or rear wheels 36 and 38 are driven and steerable. Similarly, one front wheel and one rear wheel may be driven and/or steerable, or the vehicle may include one or more driven or steerable wheels underneath its body that are generally hidden by the body of the vehicle.

Some or all of the plurality of wheels 22 may include a hub portion 39 and a tire portion 40, as indicated in FIG. 1. When present, the hub and tire portions may be integrally formed, or the hub and tire portions may be formed as separate parts that are secured together by screws, bolts, clips, adhesives, or other suitable fasteners or fastening methods. The hub and tire portions may be formed from the same or different materials. In some embodiments, hub portion 39 and tire portion 40 may be formed from materials having different colors, such as differently colored plastics. For example, hub portion 39 may (but is not required to) be formed from a silver-colored plastic to simulate a metal hub, while tire portion 40 may (but is not required to) be formed from a black-colored plastic to simulate a rubber tire.

A portion of the vehicle's steering assembly 26 is shown in FIGS. 1 and 2 and includes a steering column 41 (indicated in FIG. 2) and a steering mechanism 42. The steering assembly enables a child sitting on seat 18 to steer the vehicle's steerable wheel assembly 24 via user-applied steering inputs to steering mechanism 42, which is positioned on vehicle 10 for operation by a child sitting on seat 18. In the illustrated embodiment, steering mechanism 42 takes the form of a steering wheel 44. Other suitable structures, such as handlebars and steering levers may be used and are within the scope of the present disclosure. Steering column 41 includes any suitable mechanical linkage that conveys a child's steering inputs from the steering mechanism to the vehicle's steerable wheel assembly, thereby steering the vehicle.

Figure 3:
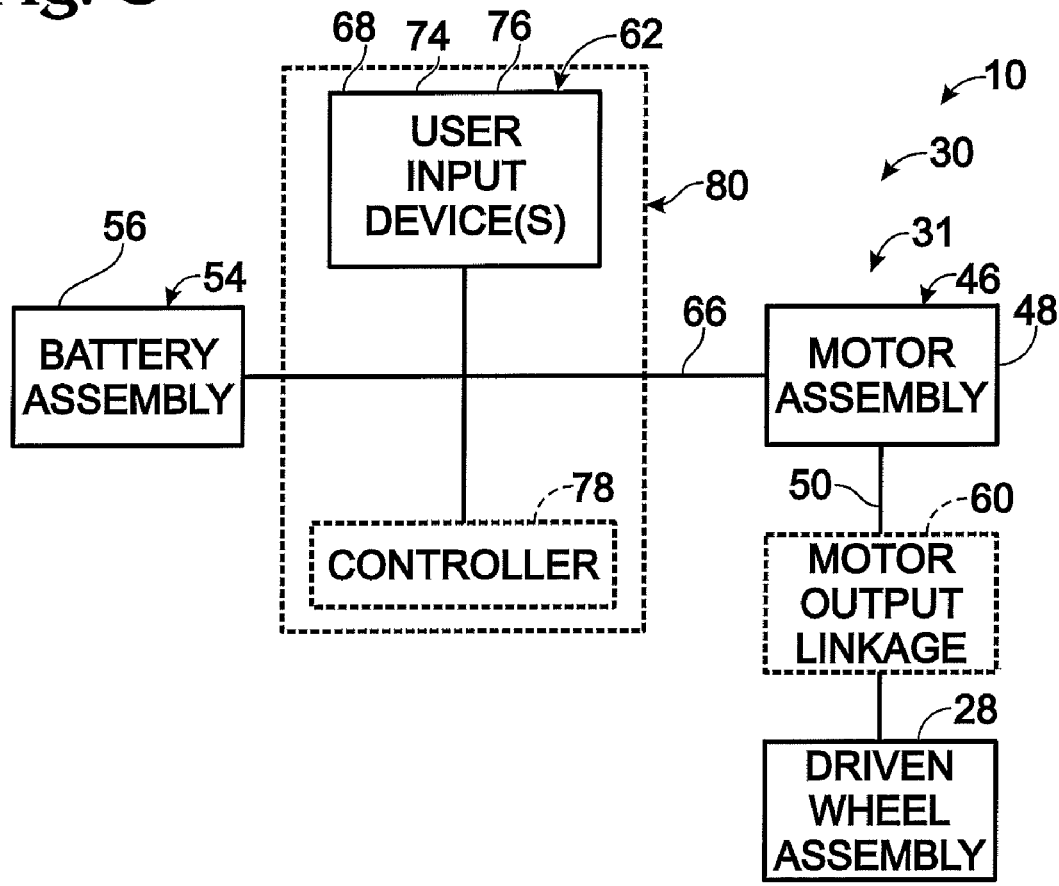
FIG. 3 is a schematic diagram of an illustrative, non-exclusive example of a motorized drive assembly suitable for use with a children's ride-on vehicle, such as a children's ride-on vehicle having at least one blow-molded wheel according to the present disclosure.

In FIG. 3, an illustrative, non-exclusive example of a suitable drive assembly 30 for a children's ride-on vehicle, such as vehicle 10, is schematically illustrated. Drive assembly 30 is adapted to drive the rotation of driven wheel assembly 28. The drive assembly 30 may be referred to as a motorized drive assembly 31 and includes a motor assembly 46, which includes at least one electric motor, such as battery-powered motor 48, that is adapted to drive the rotation of at least one of the plurality of wheels. The motor assembly 46 includes an output 50 that provides a rotational input to the driven wheel assembly 28, such as to the hub portion of one or more of the wheels 22 in driven wheel assembly 28. Typically, the output 50 from each of the at least one motors includes a rotating shaft and/or a rotating pinion or output gear. Output 50 may include more than one shaft, pinion, and/or gear, such as when motor assembly 46 includes more than one motor and/or when driven wheel assembly 28 includes more than one driven wheel. Motor assembly 46 may also be configured to power other moveable components on vehicle 10, such as depending on the form of the vehicle. For example, the motor assembly 46 may be coupled to raise and lower the blade of a ride-on that resembles a bulldozer, the bucket of a ride-on that resembles a skid-steer or other loader, the bed of a ride-on that resembles a dump truck, etc.

Power for the motor assembly 46 may be provided by battery assembly 54. Battery assembly 54 includes at least one rechargeable battery, or cell, 56 that is adapted to provide power to the motor assembly. The batteries in battery assembly 54 may be able to be selectively disconnected from the motor assembly and connected to a charging assembly to recharge the batteries. Any suitable type and number of batteries, or cells, may be used in battery assembly 54. For example, one or more six-, twelve-, eighteen-, or twenty-four-volt batteries have proven effective. The motor assembly 46 may be operably connected to the battery assembly 54 by any suitable electrical connectors, such as cables, wires, positive and negative terminals or leads, one or more plugs and corresponding sockets, and the like.

In FIG. 3, drive assembly 31 is shown further including an optional motor output linkage 60 that mechanically interconnects the motor assembly 46 with the driven wheel assembly 28. Motor output linkage 60 is any suitable mechanism that transmits the rotational input from the motor assembly's output(s) to the driven wheel assembly 28, such as to the hub portion of one or more of the wheels 22 in driven wheel assembly 28. Examples of suitable linkages include an intermediate linkage between the output 50 of the motor assembly 46 and the driven wheel assembly 28, such as a gearbox containing one or more gears, a belt or chain drive, a worm gear, one or more individual gears, and the like. The motor output linkage 60 may be adapted to transmit the rotational input from the output 50 to the driven wheel assembly 28 at the same relative rate of rotation, or it may mechanically augment the rotational input to convey a greater or lesser rate of rotation relative to the rate of rotation of the output 50. It is also within the scope of the disclosure that drive assembly 31 may be formed without motor output linkage 60, in which case rotational input from the output(s) of the motor assembly 46 may be directly transmitted to the driven wheel assembly 28.

As schematically illustrated in FIG. 3, drive assembly 31 may also include one or more user input devices 62 that are adapted to convey inputs from a child sitting on seat 18 to the drive assembly. User input devices 62 also may be referred to as user control devices. These devices convey a user's inputs, such as via the vehicle's wiring harness 66, and affect the actuation of the motor assembly 46, such as by causing the actuation (or energization) of the motor assembly, selecting between a range of electronic configurations, selecting the direction of rotation of the motor assembly's output 50, selecting the relative degree of a maximum rate of rotation to which the motor assembly is actuated, etc. Examples of suitable user input devices 62 include a drive actuator 68, through which a user input directing the battery assembly 54 to energize the motor assembly 46 is received. Examples of suitable drive actuators 68 include an on/off switch, a foot pedal, a throttle lever, and a rotational handgrip on a steering mechanism that includes a handlebar. In FIG. 2, an example of a drive actuator 68 is shown in the form of a foot pedal 70 positioned for actuation by a child sitting on seat 18. When drive actuator 68 takes a form other than a foot pedal, it may be located in any suitable location within or near passenger compartment 14 so that a child sitting on seat 18 may reach the actuator while positioned to operate vehicle 10. For example, an on/off switch or throttle may be located on the body or on the steering mechanism 42, such as illustrated at 72 in FIG. 2.

As schematically illustrated in FIGS. 2 and 3, other examples of user input devices 62 include a speed switch 74, which enables a user to select the relative rate of rotation of the motor assembly's output 50, and a direction switch 76, which enables a user to select the relative direction (i.e., clockwise or counterclockwise) of rotation of output 50 and thereby configure the vehicle 10 to drive in forward and reverse directions. Switches 74 and 76 may be located in any suitable location on body 12 or steering assembly 26 for actuation by a child sitting on seat 18. An example of a suitable speed switch 74 is a switch that selectively configures a pair of batteries between series and parallel configurations to define relative "high" and "low" speed configurations. Speed switch 74 may additionally or alternatively selectively configure a pair of motors between series and parallel configurations. As a further example, the switches may convey inputs to a controller, such as subsequently described controller 78, which, responsive to inputs from the switches, configures vehicle 10 for a selected operating state.

As illustrated in FIG. 3, drive assembly 31 may (but is not required to) further include a controller 78, which is adapted to control electronically the transmission of the rotational input from the motor assembly 46 to the driven wheel assembly 28. More specifically, controller 78 may include a microprocessor or suitable control circuit that is adapted to control the actuation, or energization, of the motor assembly 46 by the battery assembly 54 to regulate electronically the rotational input transmitted by the motor assembly 46 to the driven wheel assembly 28. Controller 78 may regulate at least one of the timing and the ramp, or rate, of application of the transmission of the rotational input after actuation of a corresponding user input device 62 by a child sitting on seat 18. In other words, the controller 78 may delay in at least time and/or rate of transmission the rotational input to the driven wheel assembly 28 responsive at least in part to a user input selecting the desired, or selected, rotational input. An illustrative example of a suitable controller is disclosed in U.S. Pat. No. 6,771,034, the complete disclosure of which is hereby incorporated by reference for all purposes. As used herein, the one or more user input devices 62 and, when present, controller 78 that are adapted to configure the vehicle's drive assembly 31 between a plurality of operating states may be referred to collectively as the vehicle's speed control assembly 80.

As shown in FIG. 2, body 12 may also include at least one battery compartment 82 that is adapted to receive battery assembly 54. The battery compartment may take any of a variety of different shapes, sizes, and configurations depending on such factors as the form of vehicle 10, the portion of the vehicle's body within which the compartment is formed, and the size and shape of battery assembly 54. FIG. 2 provides graphical illustrations of several suitable, non-exclusive positions for battery compartment 82. The battery compartment may include a cover or other closure to selectively restrict access to the battery assembly during use of the vehicle. The compartment may additionally or alternatively include a suitable retainer to position and/or secure the battery assembly within the battery compartment.

Figure 4:
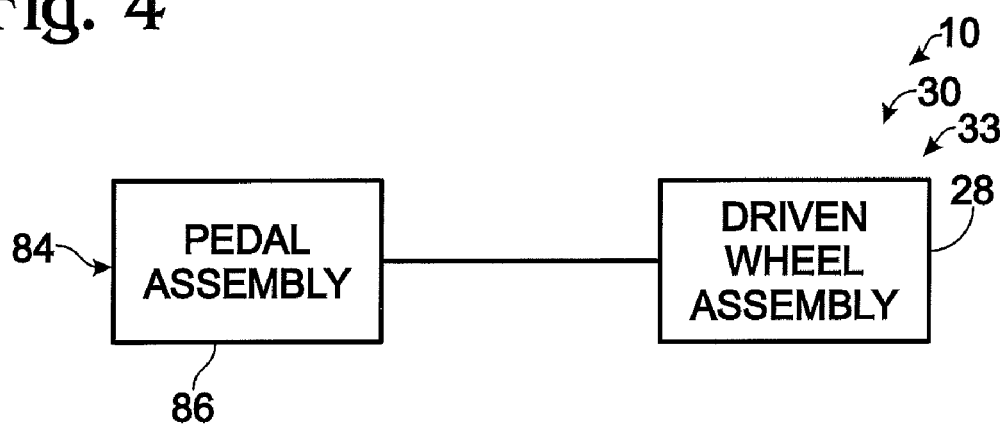
FIG. 4 is a schematic diagram of an illustrative, non-exclusive example of a manually powered drive assembly suitable for use with a children's ride-on vehicle, such as a children's ride-on vehicle having at least one blow-molded wheel according to the present disclosure.

The previously described drive assembly provided an example of a motorized drive assembly having at least one battery-powered motor. It is also within the scope of the present disclosure that children's ride-on vehicles 10 according to the present disclosure may additionally or alternatively include a manually powered drive assembly. As an illustrative example, a manually powered drive assembly may include a pedal assembly having pedals that are coupled to at least one of the plurality of wheels so that the wheels are rotatably driven as a child seated on seat 18 reciprocates the pedals. An illustrative, non-exclusive example of a suitable pedal assembly is disclosed in U.S. Pat. No. 6,651,528, the complete disclosure of which is hereby incorporated by reference for all purposes. An illustrative, non-exclusive example of a drive assembly 30 in the form of a manually powered drive assembly is schematically illustrated in FIG. 4 and generally indicated at 33. As illustrated, drive assembly 33 is a pedal-powered drive assembly in which driven wheel assembly 28 is operatively coupled to a pedal assembly 84 having pedals 86. Reciprocating rotation of pedals 86 drives the rotation of driven wheel assembly 28. It is also within the scope of the present disclosure that children's ride-on vehicles 10 having bodies 12 may be formed without a drive assembly and therefore may be adapted to be propelled by a child seated on seat 18 pushing the vehicle with the child's feet in a foot-to-floor manner, or by an adult who pushes the vehicle through any suitable mechanism.

Figure 5:
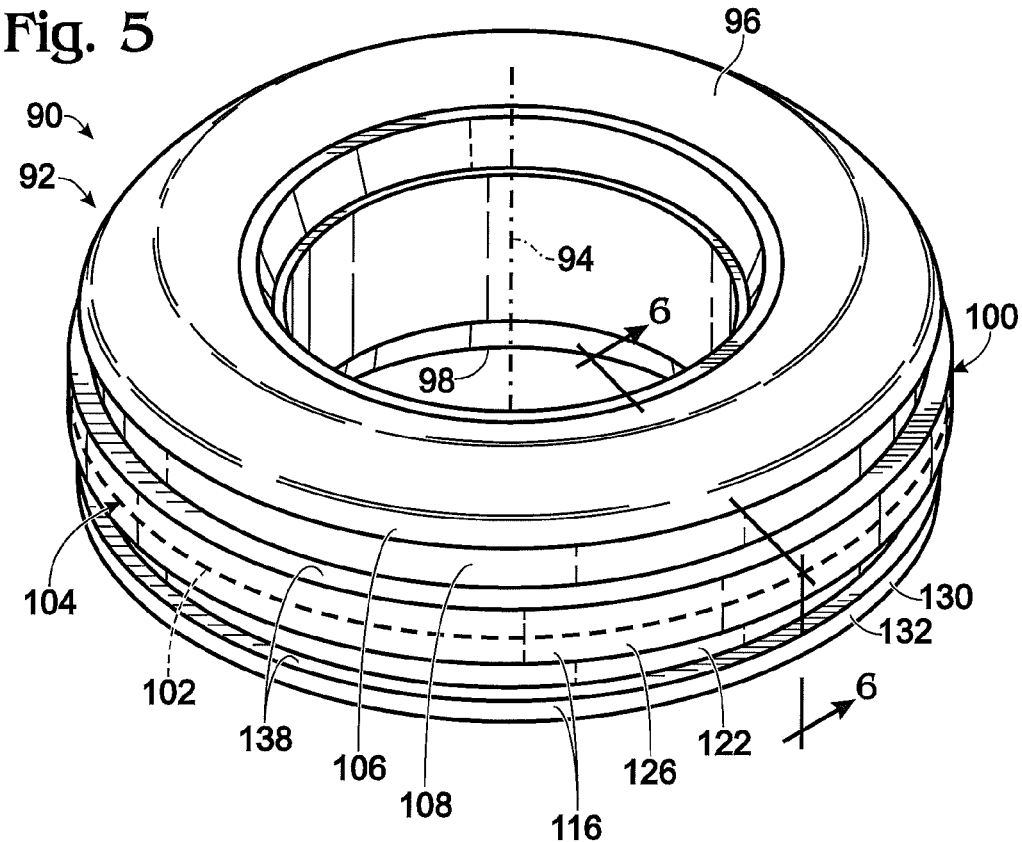
FIG. 5 is a perspective view of an illustrative example of a blow-molded wheel that has undercut tread portions and is suitable for use with a children's ride-on vehicle, such as the vehicle of FIG. 1.
Figure 6:
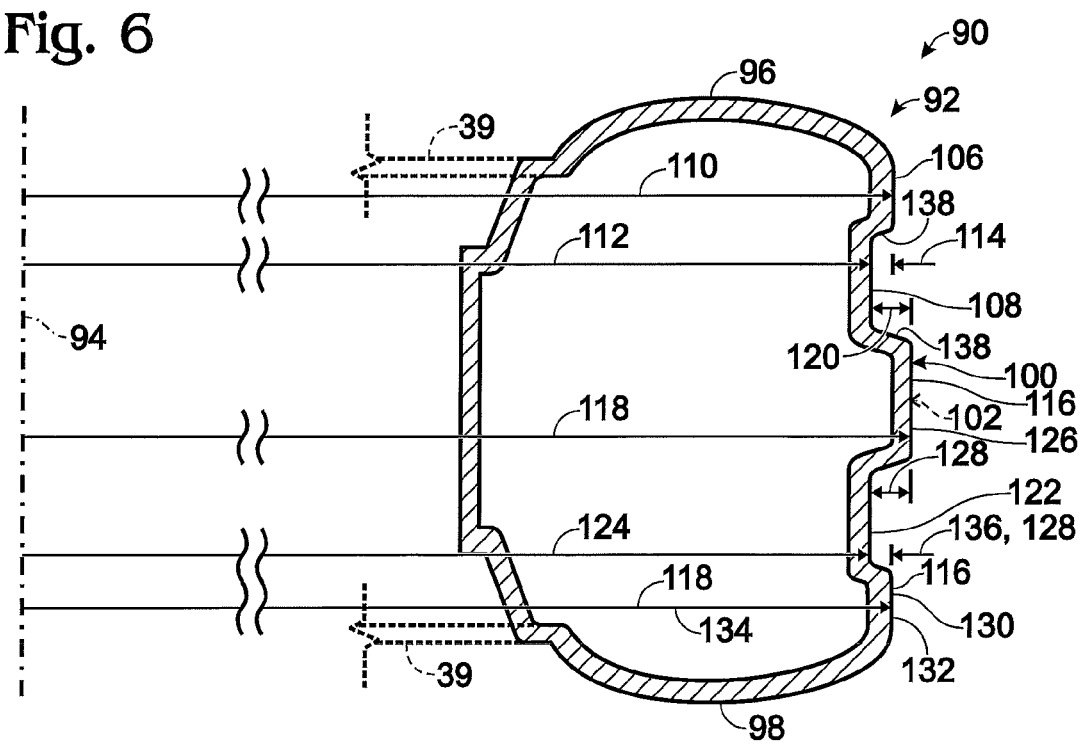
FIG. 6 is a partial sectional view of the wheel of FIG. 5, taken generally along line 6-6 in FIG. 5.

In FIGS. 5 and 6, an illustrative, non-exclusive example of a blow-molded wheel according to the present disclosure is shown at 90. As illustrated, wheel 90 has undercut tread portions. Unless otherwise specified, blow-molded wheel 90 may, but is not required to, contain at least one of the structures, components, functionality, and/or variations as the other blow-molded wheels described and/or illustrated herein. Wheel 90 includes a blow-molded wheel body 92 that is configured to rotate about an axis 94. Children's ride-on vehicles 10 according to the present disclosure may include one or more wheels 90.

As shown in FIGS. 5 and 6, blow-molded body 92 may be configured to generally resemble an un-mounted vehicle tire such that blow-molded body 92 forms a tire portion that may be suitably attached to a separate hub portion to form a wheel, as discussed above. However, it is within the scope of this disclosure for some embodiments of blow-molded body 92 to additionally include some or all of the hub portion of a wheel, such as where the blow-molded body integrally includes a tire portion and a hub portion. This is somewhat schematically illustrated in FIG. 6, in which portions of an integral hub portion 39 are shown in dashed lines. In such an embodiment, at least portions of the internal surface of body 92, such as the region extending between sidewalls 96 and 98 and opposed to tread surface 100 may not be present The blow-molded molded body 92 may include first and second sidewalls 96 and 98, and a tread surface 100 that extends circumferentially around the blow-molded body. In some embodiments, tread surface 100 may be configured to resemble the traction-enhancing tread patterns that may typically be found on the wheels of full-sized vehicles, such as the rubber tires found on automobiles, trucks, off-road vehicles, or the like, or any of the various types of steel tires found on some forms of construction or other industrial vehicles. As shown in the illustrative, non-exclusive example presented in FIGS. 5 and 6, the tread surface 100 extends circumferentially around body 92 and generally extends between the first and second sidewalls 96 and 98. Tread surface 100 may be integrally blow-molded with body 92, as shown in FIGS. 5 and 6 and generally described herein. However, it is within the scope of this disclosure for some embodiments of wheel 92 to include a tread surface 100 that forms at least a portion of a separately blow-molded part that may be secured to blow-molded body 92 using screws, bolts, clips, adhesives, or other suitable fasteners or fastening methods.

As used herein, tread surface 100 and the various regions thereof, which will be described more fully herein, refer to the external features, structures, and surfaces of the blow-molded body 92 exclusive of any particular internal structure that may, or may not, be present within the blow-molded wheel 90 and/or the blow-molded body 92. It is within the scope of the present disclosure for the various portions and regions of blow-molded body 92 to be of any suitable thickness, either constant or varying, and the shape and/or structure of the various internal surfaces or regions of blow-molded body 92 may, or may not, correspond to the adjacent external surfaces. For example, although a projection on the external surface of the blow-molded body may correspond to a recess on the internal surface of the blow-molded body, as shown in FIG. 6, it is within the scope of the present disclosure for a projection on the external surface to correspond to a relatively uniform portion of the internal surface or even to a projection on the internal surface.

The blow-molded body 92 may have a part line 102, as shown in dashed lines in FIG. 5. Part line 102 may correspond to a seam on the blow-molded body that is created by the interface between the portions of the mold used to mold blow-molded body 92, which process will be more fully discussed below. As shown in FIG. 5, part line 102 may be a planar closed curve, such as a circle, that extends around the circumference 104 of blow-molded body 92. However, it is also within the scope of the present disclosure for part line 102 to have a non-planar and/or non-circular shape. For example, part line 102 may undulate around the circumference of blow-molded body 92, such as where the radial distance from axis 94 to part line 102 varies around the circumference of the blow-molded body 92 and/or where the axial position of part line 102 relative to the first and second sidewalls 96 and 98 varies around the circumference of the blow-molded body 92.

The tread surface 100 may include a first region 106 and a second region 108, as shown in FIGS. 5 and 6. The first region 106 of tread surface 100 may include the portion, or portions, of tread surface 100 that is, or are, located a first radial distance 110 from the axis 94 and is, or are, disposed between the first sidewall 96 and the part line 102 of the blow-molded body 92. The second region 108 of tread surface 100 may include the portion, or portions, of tread surface 100 that is, or are, located a second radial distance 112 from the axis 94 and is, or are, disposed between the first region 106 and the part line 102 of the blow-molded body 92. As shown in the illustrative, non-exclusive example presented in FIG. 6, the first radial distance 110 from the axis 94 to the first region 106 exceeds the second radial distance 112 from the axis to the second region 108 by at least a first predetermined threshold 114.

In some embodiments, tread surface 100 may, but is not required to, include a third region 116, as shown in FIGS. 5 and 6. The third region 116 of tread surface 100 may include the portion, or portions, of the tread surface 100 that is, or are, located a third radial distance 118 from the axis 94 and is, or are, disposed between the second region 108 of tread surface 100 and the second sidewall 98 of the blow-molded body 92. As shown in the illustrative, non-exclusive example presented in FIG. 6, the third radial distance 118 from the axis 94 to the third region 116 exceeds the second radial distance 112 from the axis 94 to the second region 108 by at least a second predetermined threshold 120. Further, as shown in the illustrative, non-exclusive example presented in FIG. 6, the third radial distance 118 from the axis 94 to the third region 116 may exceed the first radial distance 110 from the axis 94 to the first region 106. However, it is within the scope of the present disclosure for one or more of the first radial distance 110 from the axis 94 to the first region 106 and the second radial distance 112 from the axis to the second region 108 to exceed the third radial distance 118 from the axis 94 to the third region 116. Further, it is within the scope of the present disclosure for the third radial distance 118 to be equal, or approximately equal to, the first radial distance 110.

In some embodiments, tread surface 100 may include a fourth region 122, as shown in FIGS. 5 and 6. The fourth region 122 of tread surface 100 may include the portion, or portions, of the tread surface 100 that is, or are, located a fourth radial distance 124 from the axis 94 and is, or are, disposed between at least a first portion 126 of the third region 116 of tread surface 100 and the second sidewall 98 of the blow-molded body 92. As shown in the illustrative, non-exclusive example presented in FIG. 6, the third radial distance 118 from the axis 94 to the third region 116 may exceed the fourth radial distance 124 from the axis 94 to the fourth region 122 by at least a third predetermined threshold 128. The fourth region 122 of tread surface 100 may be disposed between the part line 102 and the second sidewall 98, as shown in the illustrative, non-exclusive example presented in FIGS. 5 and 6. However, it is within the scope of the present disclosure for at least a portion of the fourth region 122 to be disposed between the part line 102 and the first sidewall 96. As shown in the illustrative, non-exclusive example presented in FIG. 6, the fourth radial distance 124 may be approximately equal to the second radial distance 112. However, it is within the scope of the present disclosure for the fourth radial distance 124 to be greater than or less than the second radial distance 112.

In some embodiments, a second portion 130 of the third region 116 of tread surface 100 may define a fifth region 132 of tread surface 100 that is disposed between the fourth region 122 and the second sidewall 98. As shown in the illustrative, non-exclusive example presented in FIGS. 5 and 6, the fifth region 132 of tread surface 100 is located a fifth radial distance 134 from the axis 94. Further, as shown in the illustrative, non-exclusive example presented in FIG. 6, the fifth radial distance 134 from the axis 94 to the fifth region 132 may exceed the fourth radial distance 124 from the axis 94 to the fourth region 122 by at least a fourth predetermined threshold 136. The third radial distance 118 from the axis 94 to the first portion 126 of the third region 116 may exceed the fifth radial distance 134 from the axis 94 to the fifth region 132, as shown in the illustrative, non-exclusive example presented in FIG. 6. However, it is within the scope of the present disclosure for the fifth radial distance 134 from the axis 94 to the fifth region 132 to exceed the third radial distance 118 from the axis 94 to the first portion 126 of the third region 116. Further, it is within the scope of the present disclosure for the fifth radial distance 134 to be equal, or approximately equal to, one or more of the first radial distance 110 and the third radial distance 118 from the axis 94 to the first portion 126 of the third region 116.

At least one of the first predetermined threshold 114, second predetermined threshold 120, third predetermined threshold 128, and fourth predetermined threshold 136, such as the first predetermined threshold 114 and/or the fourth predetermined threshold 136, may be functionally related to the manufacturing process and mold used to fabricate the blow-molded body 92. The first predetermined threshold 114 corresponds to the situation at which the first radial distance 110 sufficiently exceeds the second radial distance 112 such that any cooling-induced shrinkage of blow-molded body 92, which may occur after blowing (i.e., formation of the wheel in the mold), and/or the extent to which blow-molded body 92 may be elastically deflected or deformed as the mold portions are separated to permit removal of the wheel therefrom, either alone or in combination, are insufficient to provide removal clearance, or the ability to otherwise remove the blow-molded body 92 without damage, between the first region 106 of the tread surface 100 of blow-molded body 92 and the portion of the mold corresponding to the second region 108 of the tread surface 100 of blow-molded body 92. In particular, when the portion of the mold corresponding to the second region 108 of the tread surface 100 is in the molding position (as will be more fully discussed below) and the first radial distance 110 exceeds the second radial distance 112 by more than the first predetermined threshold 114, the portion of the mold corresponding to the second region 108 of the tread surface 100 may prevent removal of the finished blow-molded body from its mold without damaging the first region 106 of the tread surface 100 of the blow-molded body 92. Similarly, the fourth predetermined threshold 136 corresponds to the situation at which the fifth radial distance 134 sufficiently exceeds the fourth radial distance 124 such that the cooling induced shrinkage of blow-molded body 92, which occurs after blowing, and/or the extent to which blow-molded body 92 may be elastically deflected, either alone or in combination, are insufficient to provide removal clearance, or the ability to otherwise remove the blow-molded body 92 without damage, between the fifth region 132 of the tread surface 100 of blow-molded body 92 and the portion of the mold corresponding to the fourth region 122 of the tread surface 100 of blow-molded body 92. Thus, the first predetermined threshold 114, second predetermined threshold 120, third predetermined threshold 128, or fourth predetermined threshold 136, such as the first predetermined threshold 114 and/or the fourth predetermined threshold 136, may vary depending on such factors as the diameter of the blow-molded body, the material of the blow-molded body, including its thermal and mechanical properties, the molding conditions such as temperature and cooling time, or the like.

As illustrative, non-exclusive examples, any one or more of the first predetermined threshold 114, second predetermined threshold 120, third predetermined threshold 128, or fourth predetermined threshold 136 may be at least (approximately) 2 mm (millimeters), 3 mm, 4 mm, 5 mm, 6 mm, 10 mm, 12.7 mm, 25 mm, or more. Similarly, any one or more of the first predetermined threshold 114, second predetermined threshold 120, third predetermined threshold 128, or fourth predetermined threshold 136 may be at least (approximately) 0.1%, 0.5%, 1%, 2%, 5%, or even 10% or more of a diameter of blow-molded body 92, which may correspond to a diameter of part line 102, which may correspond to twice the radial distance from axis 94 to part line 102, such as twice the third radial distance 118.

As shown in the illustrative, non-exclusive example presented in FIGS. 5 and 6, any one or more of first region 106, second region 108, third region 116, fourth region 122, and fifth region 132 may be a circumferentially continuous region extending around the circumference of the blow-molded body 92, which may be at a constant radial distance from the axis 94. However, it is within the scope of the present disclosure for one or more of first region 106, second region 108, third region 116, fourth region 122, and fifth region 132 to undulate around the circumference of the blow-molded body 92, such as where the radial distance from the axis 94 to one or more of first region 106, second region 108, third region 116, fourth region 122, and fifth region 132 varies around the circumference of the blow-molded body 92.

Further, as shown in the illustrative, non-exclusive example presented in FIGS. 5 and 6, any one or more of first region 106, second region 108, third region 116, fourth region 122, and fifth region 132 may be of uniform width and be located at a constant distance from part line 102. However, it is within the scope of the present disclosure for any one or more of first region 106, second region 108, third region 116, fourth region 122, and fifth region 132 to have a variable width and/or to be located at a variable distance from part line 102. For example, any one or more of first region 106, second region 108, third region 116, fourth region 122, and fifth region 132 may vary in width around the circumference of the blow-molded body. Further, any one or more of first region 106, second region 108, third region 116, fourth region 122, and fifth region 132 may follow a wavy path around the circumference of the blow-molded body, such as where one or more of the regions of tread surface 100 is relatively closer to part line 102 at some points around the circumference of the blow-molded body than at other points around the circumference of the blow-molded body where the region is further from part line 102.

The boundaries, or transition regions, 138 between adjacent ones of first region 106, second region 108, third region 116, fourth region 122, and fifth region 132 may be of any suitable configuration. For example, as shown in the illustrative, non-exclusive example presented in FIG. 6, the transition regions may be obliquely oriented to one or more of the adjacent ones of first region 106, second region 108, third region 116, fourth region 122, and fifth region 132 and may include a radiused transition, or any other suitable type of smooth transition, to one or more of the adjacent ones of first region 106, second region 108, third region 116, fourth region 122, and fifth region 132. Exemplary angles at which a transition region may be oriented may include an angle in the range of 30 degrees to 150 degrees, such as an angle in the range of 45 and 135 degrees, in the range of 60 and 135 degrees, and/or in the range of 70 and 110 degrees. However, it is also within the scope of the present disclosure for one or more of the transition regions to be perpendicular to one or more of the adjacent ones of first region 106, second region 108, third region 116, fourth region 122, and fifth region 132 and/or to have an abrupt transition, such as an edge, to one or more of the adjacent ones of first region 106, second region 108, third region 116, fourth region 122, and fifth region 132. As shown in the illustrative, non-exclusive example presented in FIGS. 5 and 6, where the first region 106, second region 108, third region 116, fourth region 122, and fifth region 132 are of uniform width and located at a constant distance from part line 102, the transition regions 138 may be of constant width around the circumference of the body. However, it is also within the scope of the present disclosure for one or more of the transition regions 138 to vary in one or more of width, angle to adjacent regions, and/or distance from the part line 102 around the circumference of the blow-molded body.

Figure 7:
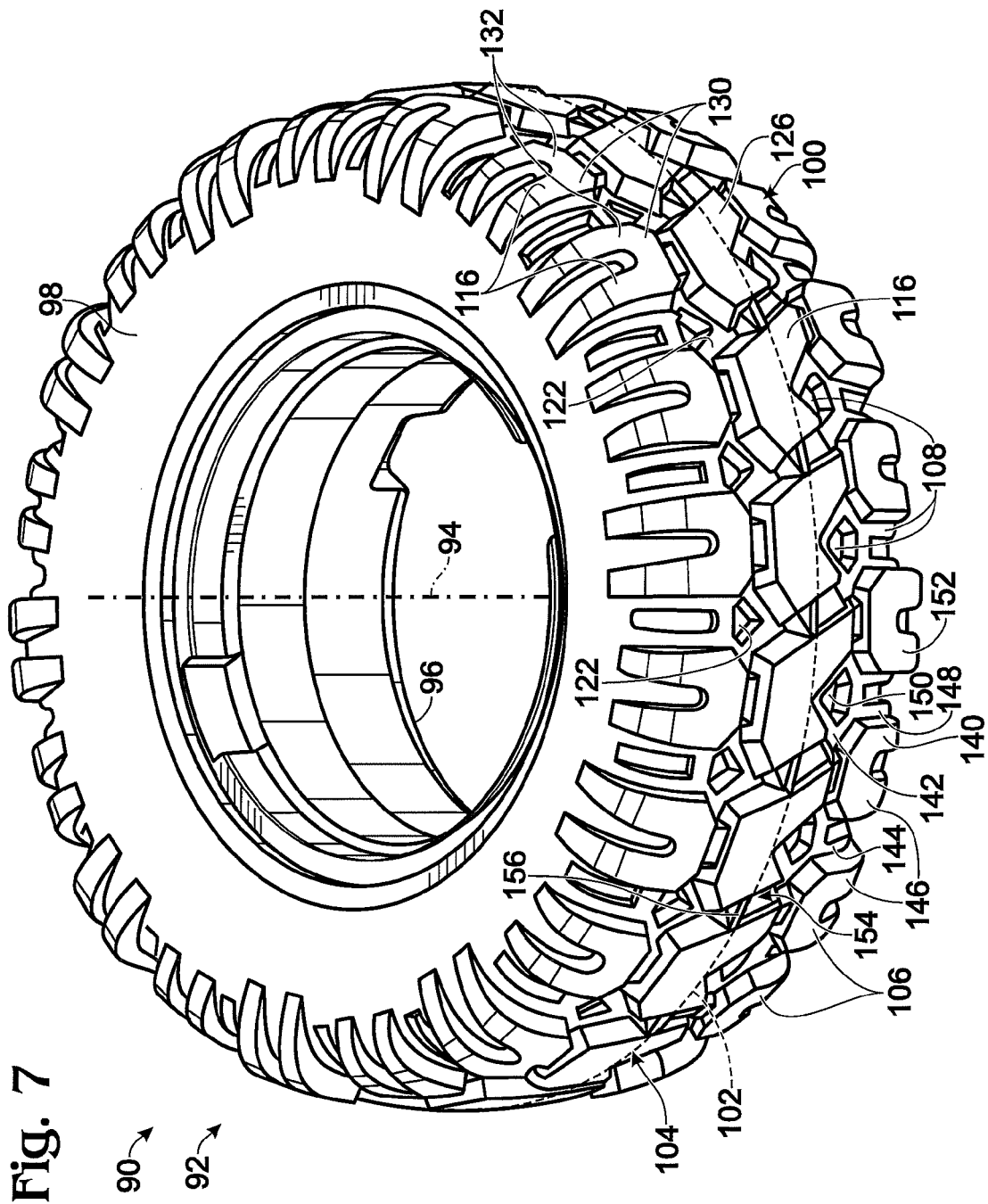
FIG. 7 is a perspective view of another illustrative example of a blow-molded wheel that has undercut tread portions and is suitable for use with a children's ride-on vehicle, such as the vehicle of FIG. 1.

In FIG. 7, another illustrative, non-exclusive example of a blow-molded wheel that has undercut tread portions according to the present disclosure is shown at 90. Unless otherwise specified, blow-molded wheel 90 may, but is not required to, contain at least one or more of the structures, components, functionality, and/or variations as the other blow-molded wheels described and/or illustrated herein.

The blow-molded wheel shown in FIG. 7 provides an illustrative, graphical example that blow-molded wheels 90 according to the present disclosure may, but are not required to, include a blow-molded body 92 with a tread surface 100 that includes a plurality of circumferentially spaced-apart first regions 106 and/or a plurality of circumferentially spaced-apart second regions 108. It is within the scope of the present disclosure that any of the plurality of circumferentially spaced-apart first regions 106 and/or a plurality of circumferentially spaced-apart second regions 108 may extend around the circumference of the blow-molded body 92 for any angular portion thereof, such as an angular portion between 0 and 360 degrees, such as an angular portion of at least (approximately) 10 degrees, 15 degrees, 18 degrees, 20 degrees, 30 degrees, 36 degrees, 45 degrees, 60 degrees, or 90 degrees, or more. Further, any of the plurality of circumferentially spaced-apart first regions 106 may extend over a greater or lesser angular portion of the circumference of the blow-molded body 92 than a given one of the plurality of circumferentially spaced-apart second regions 108. For example, at least one of the plurality of circumferentially spaced-apart first regions 106 may extend over an angular portion that is at least (approximately) 10%, 25%, 50%, 75%, 100%, 125%, 150%, 175%, 200%, or even 300% or more the size of the angular portion over which at least one of the plurality of circumferentially spaced-apart second regions 108 extends.

In some embodiments, at least a portion of at least one of the circumferentially spaced-apart first regions 106 may overlap, or be at least partially axially aligned with, at least a portion of at least one of the plurality of circumferentially spaced-apart second regions 108. For example, as shown in the illustrative, non-exclusive example presented in FIG. 7, at least a portion 140 of at least one of the circumferentially spaced-apart first regions 106 may be disposed between at least a portion 142 of at least one of the circumferentially spaced-apart second regions 108 and the first sidewall 96. Further, in some embodiments, at least a portion 144 of at least one of the circumferentially spaced-apart second regions 108 may extend axially toward the first sidewall 96 between at least a portion 146 of adjacent ones of the plurality of circumferentially spaced-apart first regions 106, as shown in the illustrative, non-exclusive example presented in FIG. 7.

As shown in the illustrative, non-exclusive example presented in FIG. 7, the blow-molded body 92 of blow-molded wheels 90 according to the present disclosure may include a base surface 148. In some embodiments, at least a portion of base surface 148 may define a first region 106 of tread surface 100 below which a plurality of spaced-apart circumferentially discontinuous regions 150 may be recessed, as shown in the illustrative, non-exclusive example presented in FIG. 7. In such an embodiment, the plurality of spaced-apart circumferentially discontinuous recessed regions 150 may define a second region 108 of tread surface 100. In some embodiments, at least a portion of base surface 148 may define a second region 108 of the tread surface 100 from which a plurality of circumferentially spaced-apart tread blocks, or tread members, 152 project, as shown in the illustrative, non-exclusive example presented in FIG. 7. In such an embodiment, the plurality of circumferentially spaced-apart tread blocks 152 may define a first region 106 of the tread surface 100.

As shown in the illustrative, non-exclusive example presented in FIG. 7, some embodiments of blow-molded wheels 90 according to the present disclosure may include, as part of the tread surface, one or more optional channels 154, which (when present) may extend across the part line 102. Channels 154 may enhance the appearance or traction of tread surface 100. As shown in FIG. 7, channels 154 may be obliquely oriented relative to part line 102. In some embodiments, an optional web, or rib, 156 may extend across channel 154 such that the obliquely oriented channel 154 is divided at the part line into a pair of channels that do not cross the part line. Web 156 may be beneficial when using a rotary tool to remove mold flash from part line 102. In particular, by dividing the obliquely oriented channel 154 at part line 102, web 156 may provide blow-molded wheel 90 with a circular part line 102 from which mold-flash may be readily removed, such as with a rotary tool.

In some embodiments, a children's ride-on vehicle 10 with a plurality of wheels 22 that includes at least one blow-molded wheel 90 according to the present disclosure may only include blow-molded wheels 90, while in other embodiments, the plurality of wheels may include one or more wheels that do not have the undercut tread described herein. As an illustrative, non-exclusive example of a children's ride-on vehicle in which the plurality of wheels are not all wheels 90, a children's ride-on vehicle 10 may include wheels 90 as its front wheels or its rear wheels, with the other wheels having a different geometry or tread pattern, such as a geometry or tread pattern that does not include the undercut tread described herein with respect to wheels 90.

Figure 8:
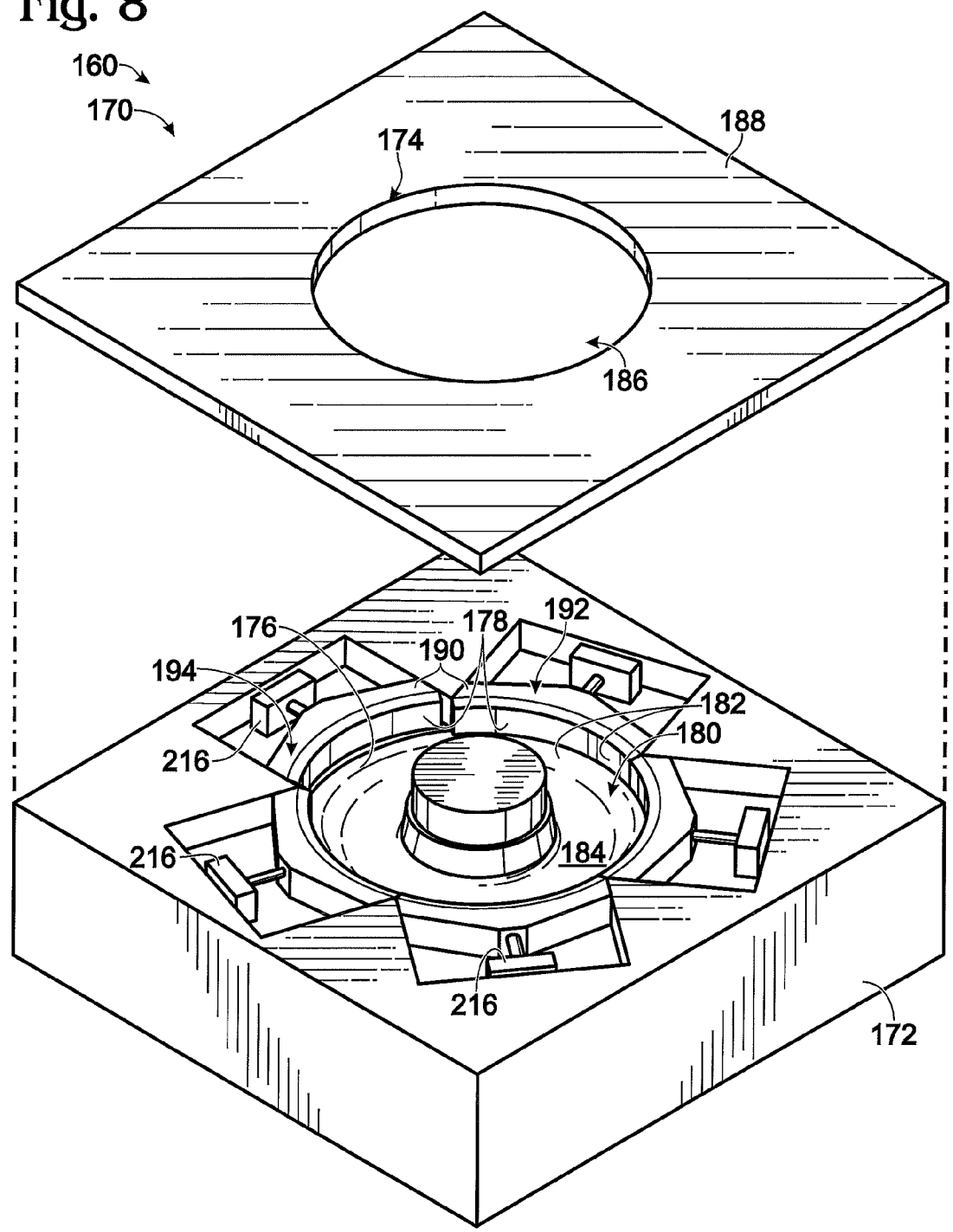
FIG. 8 is an exploded perspective view of a first portion of a simplified mold for producing a wheel that has undercut tread portions, such as a wheel similar to the wheel of FIG. 5, with the pinch-off ring shown separated from the main mold portion, with one of the mold slides shown in a release position.
Figure 9:
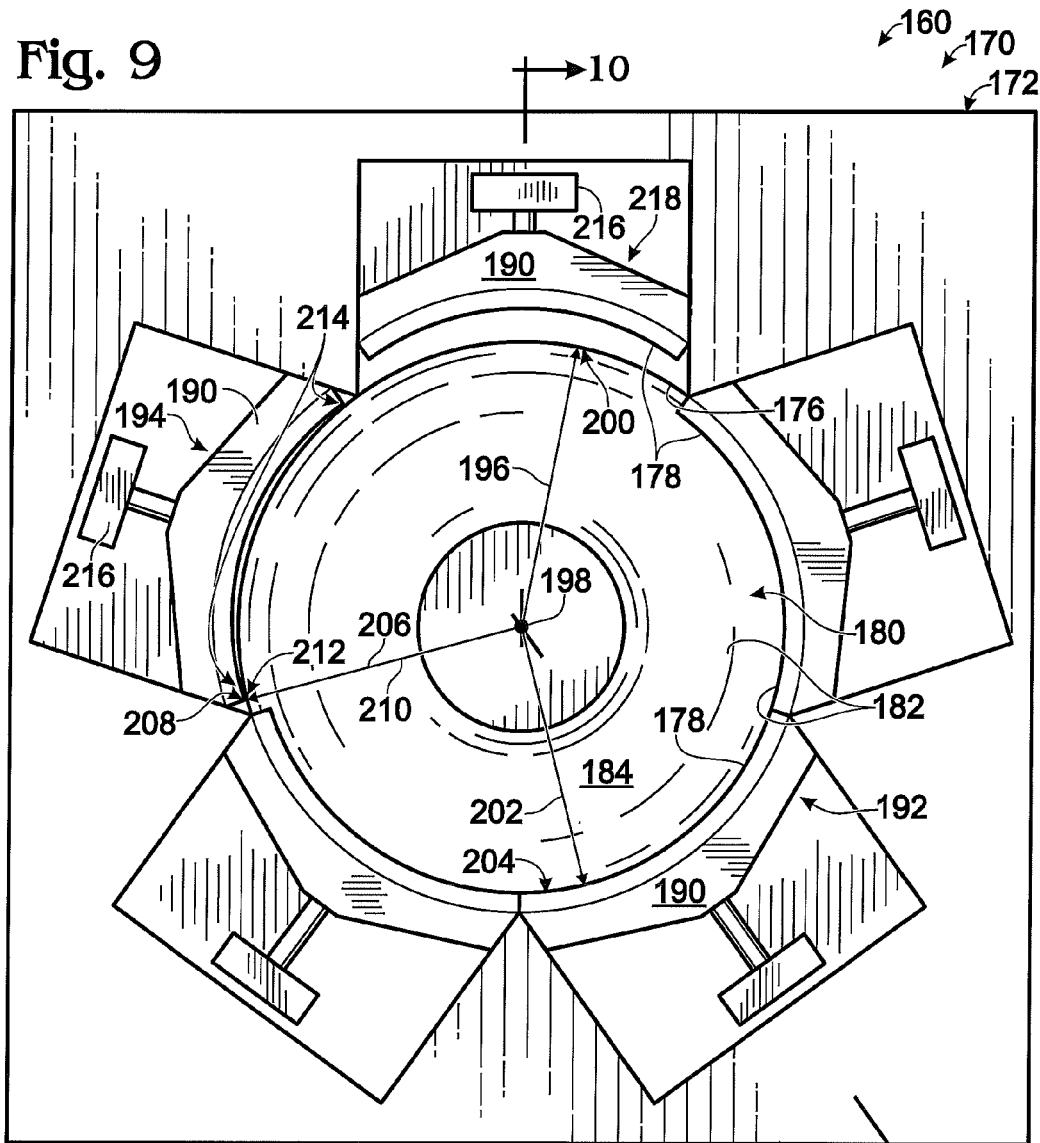
FIG. 9 is a plan view of the mold portion of FIG. 8, shown with the pinch-off ring omitted, with one of the mold slides shown in a release position and one of the mold slides in a retracted position.
Figure 10:
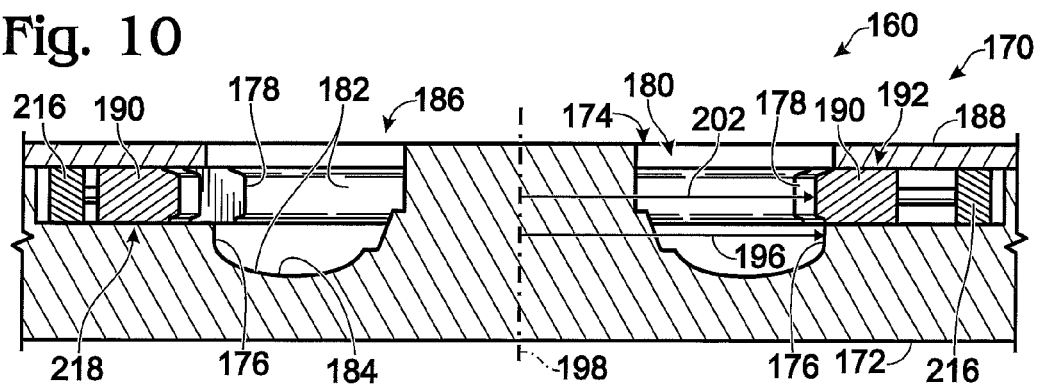
FIG. 10 is a sectional view of the mold a first portion of FIG. 8, taken generally along line 10-10 in FIG. 9, with the pinch off shown attached to the main mold portion, with one of the mold slides shown in a retracted position.

In FIGS. 8-10, an illustrative, non-exclusive example of a first portion of a simplified mold 160 for producing a blow-molded wheel (90) that has undercut tread portions according to the present disclosure is shown at 170. Unless otherwise specified, the second portion of the mold (not shown) may, but is not required to, contain at least one of the structures, components, functionality, and/or variations as the first mold portion described and/or illustrated herein. In some embodiments, the second mold portion may be a mirror image, or at least substantially identical to, the first mold portion, although this is not required. Although mold portion 170 is simplified, relevant portions of mold portion 170 will be discussed with regard to the corresponding portions of the various embodiments of blow-molded wheel 90 discussed above. However, it should be understood that a mold that is based on mold portion 170 may be used to manufacture any blow-molded wheel that has undercut tread portions, which may, but is not required to, contain at least one of the structures, components, functionality, and/or variations as any of the blow-molded wheels described and/or illustrated herein. Further, it is within the scope of the present disclosure that wheels 90 according to the present disclosure may be manufactured in any suitable mold and/or molding process, which may, but is not required to, contain at least one of the structure, components, functionality, and/or variations of the mold portion described and/or illustrated herein.

As illustrated in FIGS. 8 and 10, mold portion 170 may include a main, or primary, mold portion 172, at least one pinch-off ring 174, a first tread-molding portion 176, and at least one second tread-molding portion 178. The main mold portion 172 includes a cavity 180 that has an internal surface 182 that is configured to define the exterior shape of at least a portion of a wheel that is blow-molded or otherwise formed within cavity 180. The internal surface 182 includes a sidewall molding portion 184 that is configured to mold a first sidewall, such as first sidewall 96, of a wheel that is blow-molded or otherwise formed within cavity 180. As illustrated in the simplified example of FIGS. 8-10, the main mold portion, first and second tread molding portions 176 and 178, and internal surface 182 are depicted as having smooth surfaces oriented to contact, or define the shape of the wheel (90) formed in the mold. This configuration is not required. In some embodiments, at least one or more of these portions and/or surfaces may have one or more of irregular configurations, ridges, projections, depressions, channels, tread-defining portions, and the like. As a more specific example, it should be understood that a mold for producing the wheel 90 of FIG. 5 will have differently shaped portions and/or surfaces than a mold for producing the wheel 90 of FIG. 7, even though both are within the scope of the present disclosure.

The at least one pinch-off ring 174 of the first mold portion 170 is configured to engage the at least one pinch-off ring of the second mold portion (not shown) when the first and second mold portions are brought together to form a full mold cavity during a molding operation. The interface between the pinch-off rings of the first and second mold portions when the mold is closed may define the part line of the mold, and thereby define a part line, or seam, of a wheel produced in the mold. As shown in FIGS. 8 and 10, pinch-off ring 174 may have a planar configuration, which would correspond to a planar part line on blow-molded wheel 90 that may lie in a plane that is normal to axis 94 of blow-molded wheel 90.

As shown in FIGS. 8 and 10, pinch-off ring 174 may include an opening 186, which may be configured to form a circumference or part line on a blow-molded wheel, such as a wheel similar to blow-molded wheel 90. As shown in the illustrative, non-exclusive example presented in FIGS. 8 and 10, the pinch-off ring 174 may have a squared-off, or otherwise rectilinear, edge or corner. However, it is within the scope of the present disclosure for pinch-off ring 174 to include a sharpened edge for impingement on a parison when the first and second mold portions are brought together to form the full mold cavity during the molding process.

One or more of the pinch-off rings used with first mold portion 170 may be a distinct component from main mold portion 172. For example, as shown in FIGS. 8 and 10, pinch-off ring 174 may be a part of a pinch-off plate 188 that may be attached to, or otherwise positioned relative to, main mold portion 172. When used with main mold portion 172, pinch-off plate 188 may form at least a portion of cavity 180 and/or internal surface 182, as shown in FIGS. 8 and 10. Pinch-off plate 188 may be attached to first mold portion 170 using any suitable attachment method, such as bolts, adhesives, clips, welding, or the like. Pinch-off plate 188 may be removably, permanently, or semi-permanently attached to mold portion 170. Use of a removable or semi-permanent attachment may improve the lifespan of mold portion 170, such as by enabling repair, replacement, and/or substitution of pinch-off plate 188.

In some embodiments, pinch-off plate 188 may be fabricated from a material different than the material used for main mold portion 172 to address the different conditions that the various mold components may experience during use. For example, the internal surface 182 of the mold cavity 180 may experience relatively little wear during use such that the main mold portion 172 may be fabricated from relatively softer material, such as aluminum. In contrast, pinch-off rings 174 may experience relatively greater wear during use, such as when pinch-off ring 174 includes a sharpened edge, which may tend to dull during extended use. Thus, the wear properties and/or the tool life of pinch-off plate 188 may be improved if pinch-off plate 188 is fabricated from a harder material than is used for main mold portion 172. Illustrative, non-exclusive examples of materials that may be suitable for pinch-off plate 188 may include a nickel-copper alloy, such as Ampcoloy 940, which has a Rockwell hardness of 94B and is sold by Ampco Metal Inc. of Arlington Heights, Ill., or a beryllium-copper alloy, such as MoldMAX HH®, which has a Rockwell hardness of 40C and is sold by Brush Wellman Incorporated of Cleveland, Ohio. Other materials may be used within the scope of the present disclosure, with the above being illustrative, non-exclusive examples.

As illustrated in FIGS. 8-10, first tread-molding portion 176 may be configured to mold a first region of the tread surface of a wheel that is blow-molded or otherwise formed within cavity 180, such as wheel 90. For example, first tread-molding portion 176 may be configured to mold a first region 106 of the tread surface 100 that is disposed between the first sidewall 96 and the part line 102, which is defined by interface between the first and second mold portions, as shown in FIGS. 8-10.

As shown in FIGS. 8-10, at least one of the at least one second tread-molding portion 178 may be configured to mold a second region of the tread surface of a wheel that is blow-molded or otherwise formed within cavity 180, such as wheel 90. For example, second tread-molding portion 178 may be configured to mold a second region 108 of the tread surface 100 that is disposed between the first region 106 and the part line 102 that is defined by the interface between the first and second mold portions, as shown in FIGS. 8-10. In some embodiments, the second tread-molding portion 178 may be configured to mold a plurality of circumferentially spaced-apart tread blocks on the second region of the tread surface, such as those shown on the illustrative, non-exclusive example of wheel 90 that is presented in FIG. 7.

As shown in the illustrative, non-exclusive example presented in FIGS. 8-10, the at least one second tread-molding portion 178 may include plural radially spaced second tread-molding portions 178. As illustrative, non-exclusive examples, the at least one second tread-molding portion 178 may include 2, 3, 4, 5, 6, 7, 8, 9, 10, or even 12 or more radially spaced second tread-molding portions 178. Each of the at least one second tread-molding portion 178 may subtend any suitable angle. As illustrative, non-exclusive examples, any one or more of the at least one second tread-molding portion 178 may subtend an angle of approximately 180 degrees, 120 degrees, 90 degrees, 72 degrees, 60 degrees, 51.4 degrees, 45 degrees, 40 degrees, 36 degrees, 30 degrees, 20 degrees, 15 degrees, 10 degrees, and/or an angle in the range of 0-180 degrees, 10-40 degrees, 20-50 degrees, 30-60 degrees, 40-100 degrees, 60-140 degrees, 70-160 degrees, 80-100 degrees, 115-180 degrees, or any other suitable angle or range of angles. In some embodiments, each of the at least one second tread-molding portion 178 may subtend an equal angle. In some embodiments, each of the at least one second tread-molding portion 178 may subtend an angle equal to 360 degrees divided by the number of plural radially spaced second tread-molding portions. For example, as shown in the illustrative, non-exclusive example presented in FIGS. 8-10, the at least one second tread-molding portion 178 may include five second tread-molding portions, each of which subtend an angle of 72 degrees. However, it is within the scope of the present disclosure for the plural radially spaced second tread-molding portions to cumulatively subtend an angle of less than 360 degrees, such as where the second region 108 of the tread surface 100 is circumferentially discontinuous.

In the illustrative example shown in FIGS. 8-10, the second tread-molding portions 178 are oriented in a coplanar, radially spaced-apart configuration. This is an illustrative, but not exclusive, example. It is within the scope of the present disclosure that the second tread-molding portions of a mold portion for a mold for producing wheels 90 may include one or more of discontinuously spaced second tread-molding portions, more than one coplanar plurality of radially spaced second tread-molding portions, second tread-molding portions that extend in non-radial orientations to each other, etc.

The at least one second tread-molding portion 178 may be a portion of a movable mold portion, or mold slide, 190 that is configured to move inwardly and outwardly relative to the first tread-molding portion 176. In some embodiments, all of the second tread-molding portions 178 will form portions of movable mold portions 190. In particular, movable mold portion 190 may be configured to cause the at least one second tread-molding portion 178 to move inwardly and outwardly relative to the first tread-molding portion 176 between at least a molding position 192 and a release position 194, as shown in the illustrative, non-exclusive example presented in FIGS. 8 and 9.

As shown in the illustrative, non-exclusive example presented in FIGS. 9 and 10, the second tread-molding portion 178, as a portion of movable mold portion 190, is in the molding position 192 when a first radial distance 196 from an axis 198 (which may be an axis of symmetry and may correspond to the axis 94 of wheel 90) of first mold portion 170 to at least a first region (200) of the first tread-molding portion 176 exceeds a second radial distance 202 from axis 198 to at least a second region (204) of the second tread-molding portion 178 by a first predetermined threshold. The first predetermined threshold may correspond to the situation at which the first radial distance 196 sufficiently exceeds the second radial distance 202 such that any cooling-induced shrinkage, which may occur after blowing, of the blow-molded wheel (90) produced in simplified mold 160 and/or the extent to which the blow-molded wheel (90) may be elastically deflected, either alone or in combination, are insufficient to provide removal clearance, or the ability to otherwise remove the blow-molded wheel (90) without damage, between the second region (204) of the second tread-molding portion 178 and the portion of the tread surface of the blow-molded wheel (90) that is molded by the first region (200) of the first tread-molding portion 176, when the second tread-molding portion 178, as a portion of movable mold portion 190, is in the molding position 192. In some embodiments, the first predetermined threshold may be selected such that the blow-molded wheel may not be removed from the first and second mold portions without damaging the wheel unless the at least one second tread-molding portion is in the release position. In some embodiments, the first predetermined threshold may be selected to exceed the distance between the blow-molded wheel and a portion of the mold cavity in which the wheel is formed, such as the first tread-molding portion, and in some embodiments, it may exceed this distance by at least 1, 2, 3, 4, 5, 6, 8, 10, or more millimeters.

As illustrative, non-exclusive examples, the first predetermined threshold may be at least (approximately) 2 mm (millimeters), 3 mm, 4 mm, 5 mm, 6 mm, 10 mm, 12.7 mm, 25 mm, or more. Similarly, the first predetermined threshold may be at least (approximately) 0.1%, 0.5%, 1%, 2%, 5%, or even 10% or more of the diameter of the opening 186 of pinch-off ring 174. As shown in the illustrative, non-exclusive example presented in FIGS. 8-10, when the second tread-molding portion 178 is in the molding position 192, the radial distance from axis 198 to every portion of the second tread-molding portion 178 may be less than the radial distance from axis 198 to every portion of the first tread-molding portion 176. However, it is within the scope of the present disclosure for the radial distance from axis 198 to only certain portions of the second tread-molding portion 178 to be less than the radial distance from axis 198 to every portion of the first tread-molding portion 176. In some embodiments, the second radial distance 202 from axis 198 to second region 204 may correspond to the minimum radial distance from axis 198 to the second tread-molding portion 178 when movable mold portion 190 is in the molding position 192.

As shown in the illustrative, non-exclusive example presented in FIG. 9, the second tread-molding portion 178, as a portion of movable mold portion 190, is in the release position 194 when a third radial distance 206 from the axis 198 to a third region 208 of the second tread-molding portion 178 is at least as great as a distance that corresponds to a fourth radial distance 210 less a second predetermined threshold. The fourth radial distance 210 is the distance from the axis 198 to a fourth region 212 of the first tread-molding portion 176, where the fourth region 212 is the region of the first tread-molding portion 176 that is adjacent the third region 208 of the second tread-molding portion 178 when the second tread-molding portion 178, as a portion of movable mold portion 190, is in the release position 194. In particular, as shown in the illustrative, non-exclusive example presented in FIG. 9, where the second tread-molding portion 176 is configured to have a uniform minimum radial distance when second tread-molding portion 176 is in the molding position 192 and when movable mold portion 190 is translated outward from the molding position 192, the second tread-molding portion 176 will be closest to axis 94 (i.e., will have a minimum radial distance to axis 94) at end regions 214 (which correspond to third region 208). Thus, in the illustrative, non-exclusive example presented in FIGS. 8 and 9, the second tread-molding portion 178 will be in release position 194 when the radial distance from axis 94 to end regions 214 is not less than (other than by the second predetermined threshold) fourth radial distance 210. However, it is within the scope of the present disclosure for either or both of third radial distance 206 and fourth radial distance 210 to vary or undulate around the circumference of cavity 180. Thus, the second tread-molding portion 178, as a portion of movable mold portion 190, may be in a release position when any given portion of the second tread-molding portion 178 is no closer to axis 198 (other than by the second predetermined threshold) than whichever portion of the first tread-molding portion 176 is immediately adjacent to the given portion of the second tread-molding portion 178 when the second tread-molding portion 178 is in a particular position relative to the first tread-molding portion 176.

The second predetermined threshold corresponds to the extent by which the third radial distance 206 from the axis 198 to a third region 208 of the second tread-molding portion 178 may be less than the fourth radial distance 210 (as defined above) and still provide removal clearance, or the ability to otherwise remove the blow-molded wheel (90) without damage, between the third region 208 of the second tread-molding portion 178 and the portion of the tread surface of the blow-molded wheel (90) that is molded by the fourth region (212) of the first tread-molding portion 176, when the second tread-molding portion 178, as a portion of movable mold portion 190, is in the release position 194. As illustrative, non-exclusive examples, the second predetermined threshold may be at least (approximately) zero millimeters, 1 mm (millimeters), 2 mm, 3 mm, 4 mm, 5 mm, 6 mm, 10 mm, 12.7 mm, 25 mm, or more. In some embodiments, the second predetermined threshold may be a negative value, such that, even when the second tread-molding portion 178 is in the release position, at least a given portion of the second tread-molding portion 178 may remain closer to axis 198 than whichever portion of the first tread-molding portion 176 is immediately adjacent to the given portion of the second tread-molding portion 178 when the second tread-molding portion 178 is in the release position. In such an embodiment, removal clearance, or the ability to otherwise remove the blow-molded wheel (90) without damage, may be provided by cooling induced shrinkage of the blow-molded wheel and/or the extent to which the blow-molded wheel (90) may be elastically deflected, either alone or in combination. As illustrative, non-exclusive examples, the second predetermined threshold may be less than (i.e., a greater negative value) (approximately) zero millimeters, −1 mm, −2 mm, −3 mm, or even greater negative values.

As shown in the illustrative, non-exclusive example presented in FIGS. 8-10, each of the movable mold portions 190 may be provided with an actuator 216. Each of the actuators 216 may be configured to move the corresponding movable mold portion 190, as well as corresponding the second tread-molding portion 178, inwardly and outwardly, such as between the molding position 192 and the release position 194. Suitable actuator types may include pneumatic, hydraulic, electric, or any other type of actuator capable of producing the desired motion, which may be linear, arcuate, or the like. As shown in the illustrative, non-exclusive example presented in FIGS. 8-10, the actuators 216 may move the corresponding movable mold portion 190 linearly radially inwardly and outwardly. However, it is within the scope of the present disclosure for the actuators 216 to move the movable mold portions 190 in a different manner, such as pivotingly or the like. In some embodiments, the actuators 216 may additionally be configured to move the corresponding movable mold portion 190, as well as corresponding the second tread-molding portion 178, to a retracted position 218, as shown in FIGS. 9 and 10.

Wheels 90 that have undercut tread portions according to the present disclosure may be produced using a blow-molding process, although it is also within the scope of the present disclosure that the wheels (90) that are described and/or illustrated herein may additionally or alternatively be formed from another suitable process, such as an injection molding process. Therefore, while wheels 90 have been described herein as being blow-molded wheels, they may alternatively be formed by other processes without departing from the scope of the present disclosure. However, in many applications, wheels 90 will be formed from a blow-molding process, which has proven to be cost-effective and reliable. Any suitable plastic or other moldable material may be used to produce wheels 90 according to the present disclosure. The particular choice of materials may vary from application to application, and may vary according to one or more of such illustrative factors as design preferences, wheel size, ride-on vehicle size, ride-on vehicle speed range, ride-on vehicle load-carrying capacity, expected terrain, etc.

A mold suitable for blow-molding a wheel that has undercut tread portions may include first and second mold portions that collectively define a mold cavity that is configured to mold a wheel having a tread surface, first and second sidewalls and an axis. The first and second mold portions may be configured to separate in a direction that is parallel to the axis of the wheel. Unless otherwise specified, one or both of the first and second mold portions may, but are not required to, contain at least one of the structures, components, functionality, and/or variations as the mold portion 170 described and/or illustrated herein.

When a wheel 90 is produced by a blow-molding process in such a mold, a parison of molten material, such as a plastic, may be formed and positioned between the first and second mold portions. The first and second mold portions may be closed on the parison. Either before or after the first and second mold portions are closed on the parison, at least one mold slide may be moved inward toward a molding position such that a tread-molding portion may extend into the mold cavity to form an undercut tread portion for a blow-molded wheel, such as a blow molded wheel having undercut treads.

A pressurized gas may be injected into the parison such that the parison may be blown into a blow-molded wheel that has a shape that corresponds to the shape of the mold cavity defined by the first and second mold portions, including the first and second tread-molding portions. The shape of the resulting blow-molded wheel may include first and second regions 106 and 108 of the tread surface 100 that correspond to the first and second tread-molding portions 176 and 178.

Prior to separating the first and second mold portions, the at least one mold slide may be moved from the molding position toward the release position such that the undercut tread portion of the blow-molded wheel may be released from the mold. The first and second mold portions may be separated to release the resulting blow-molded wheel from the mold, such as after an optional, and often brief, cool-down period. Subsequent to release from the mold, any portions of the parison that remain attached to the blow-molded wheel may be removed using any suitable method. For example, when the pinch-off rings include a squared-off edge, as discussed above, any portions of the parison that remain outside the mold cavity (i.e., molding "flash") may be removed with a rotary tool. However, when the pinch-off rings include a sharpened edge, as discussed above, any molding flash may be only minimally attached to the finished blow-molded wheel and may be readily removed, such as by snapping off the molding flash by hand or another suitable process.

INDUSTRIAL APPLICABILITY

The present disclosure is applicable to blow-molded wheels, methods for producing the same, and children's ride-on vehicles including the same.

It is believed that the disclosure set forth herein encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the disclosure includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A method of blow-molding a wheel for use on a children's ride-on vehicle, the method comprising:
   providing a mold, the mold comprising first and second mold portions, wherein the first and second mold portions collectively define a mold cavity configured to mold a wheel having a tread surface, first and second sidewalls and an axis, wherein the first and second mold portions are configured to separate in a direction parallel to the axis of the wheel, wherein at least one of the first and second mold portions comprises:
      a first tread-molding portion, wherein the first tread-molding portion is configured to mold at least a first region of the tread surface, wherein the first region is disposed between the first sidewall and a part line defined by an interface between the first and second mold portions;
      at least one second tread-molding portion, wherein the second tread-molding portion is configured to mold a second region of the tread surface, wherein the second region is disposed between the first region and the part line, wherein the second tread-molding portion is configured to move inwardly and outwardly relative to the first tread-molding portion between a molding position and a release position, wherein the molding position comprises:
         the second tread-molding portion positioned relative to the first tread-molding portion such that a first radial distance from the axis to at least a first region of the first tread-molding portion exceeds a second radial distance from the axis to at least a second region of the second tread-molding portion by a first predetermined threshold;
      and the release position comprises:
         the second tread-molding portion positioned relative to the first tread-molding portion such that a third radial distance from the axis to a third region of the second tread-molding portion is at least as great as a distance corresponding to:
            a fourth radial distance from the axis to a fourth region of the first tread-molding portion that is adjacent the third region of the second tread-molding portion when the second tread-molding portion is in the release position, less a second predetermined threshold;
   forming a parison of molten material;
   positioning the parison between the first and second mold portions;
   closing the first and second mold portions on the parison;
   injecting a pressurized gas into the parison to blow the parison into a blow-molded wheel having a shape corresponding to the shape of the mold cavity, including regions of the wheel corresponding to the first and second regions of the tread surface;
   moving each of the at least one second tread-molding portion from the molding position to the release position; and
   separating the first and second mold portions to release the blow-molded wheel from the mold.

2. The method of claim 1, wherein the first predetermined threshold is at least three millimeters.

3. The method of claim 1, wherein the first predetermined threshold is at least five millimeters.

4. The method of claim 1, wherein the first predetermined threshold is selected such that the blow-molded wheel may not be removed from the first and second mold portions without damaging the wheel unless the at least one second tread-molding portion is in the release position.

5. The method of claim 1, wherein the first predetermined threshold exceeds a distance between the first tread-molding portion and the tread surface of the blow-molded wheel.

6. The method of claim 1, wherein the second predetermined threshold is three millimeters.

7. The method of claim 1, wherein the second predetermined threshold is zero.

8. The method of claim 1, wherein the third radial distance corresponds to a minimal radial distance between the axis and the second tread-molding portion when the second tread-molding portion is in the release position.

9. The method of claim 1, further comprising providing at least one of the first and second mold portions with a replaceable pinch-off ring.

10. The method of claim 1, wherein the at least one second tread-molding portion comprises plural radially spaced second tread-molding portions.

11. The method of claim 10, wherein each of the plural radially spaced second tread-molding portions subtends an equal angle.

12. The method of claim 10, wherein each of the plural radially spaced second tread-molding portions subtends an angle equal to three hundred sixty degrees divided by the number of plural radially spaced second tread-molding portions.

13. The method of claim 1, wherein the at least one second tread-molding portion is configured to mold a plurality of circumferentially spaced-apart tread blocks on the second region of the tread surface.

14. The method of claim 1, further comprising moving at least one of the at least one second tread-molding portion to the molding position prior to closing the first and second mold portions on the parison.

15. The method of claim 1, wherein the first predetermined threshold is at least the larger of ⅛ inch and 0.1% of the first radial distance.

16. A method of molding a wheel for use on a children's ride-on vehicle, the method comprising:
   positioning molten material in a mold, wherein the mold includes first and second mold portions, the first mold portion including first and second tread-molding portions; and
   releasing a molded wheel from the mold, wherein the molded wheel defines an axis, and wherein the releasing includes:
      sliding the second tread-molding portion relative to the first tread-molding portion in a direction other than parallel to the axis of the molded wheel; and
      separating the first mold portion and the second mold portion in a direction parallel to the axis of the molded wheel.

17. The method of claim 16, wherein the sliding the second tread-molding portion includes sliding the second tread-molding portion relative to the first tread-molding portion in a direction perpendicular to the axis of the molded wheel.

* * * * *